United States Patent
Sarkar et al.

(10) Patent No.: US 7,452,622 B2
(45) Date of Patent: *Nov. 18, 2008

(54) METAL-SUPPORTED TUBULAR FUEL CELL

(75) Inventors: Partho Sarkar, Edmonton (CA); Hongsang Rho, Edmonton (CA); Lorne Johanson, Edmonton (CA); Luis Yamarte, Edmonton (CA)

(73) Assignee: Alberta Research Council Inc., Edmonton, Alberta (CA)

( * ) Notice: Subject to any disclaimer, the term of this patent is extended or adjusted under 35 U.S.C. 154(b) by 478 days.

This patent is subject to a terminal disclaimer.

(21) Appl. No.: 10/522,235
(22) PCT Filed: Jul. 24, 2003
(86) PCT No.: PCT/CA03/01118
§ 371 (c)(1), (2), (4) Date: Aug. 9, 2005
(87) PCT Pub. No.: WO2004/012287
PCT Pub. Date: Feb. 5, 2004

(65) Prior Publication Data
US 2006/0051643 A1 Mar. 9, 2006

Related U.S. Application Data

(63) Continuation of application No. 10/207,668, filed on Jul. 25, 2002, now Pat. No. 6,893,762, which is a continuation-in-part of application No. 10/156,755, filed on May 23, 2002, now Pat. No. 6,936,367, which is a continuation-in-part of application No. 10/078,548, filed on Feb. 14, 2002, now Pat. No. 6,824,907, which is a continuation-in-part of application No. 10/053,241, filed on Jan. 16, 2002, now Pat. No. 6,846,588.

(51) Int. Cl.
*H01M 8/12* (2006.01)
*B05D 5/12* (2006.01)

(52) U.S. Cl. .......................... 429/31; 427/115; 264/618
(58) Field of Classification Search .................. 429/30, 429/31, 32, 33; 427/115; 264/618
See application file for complete search history.

(56) References Cited

U.S. PATENT DOCUMENTS
4,454,207 A 6/1984 Fraioli et al.

(Continued)

FOREIGN PATENT DOCUMENTS
DE 3922673 1/1991

(Continued)

OTHER PUBLICATIONS
Apr. 29, 2004, International Search Report.

(Continued)

*Primary Examiner*—Stephen J. Kalafut
(74) *Attorney, Agent, or Firm*—Jeffer Mangels Butler & Marmaro LLP

(57) ABSTRACT

This invention relates to a method of manufacturing a metal-supported tubular micro-solid oxide fuel cell, and a fuel cell made from such method. The method comprises the steps of coating a wooden substrate member with a conductive substrate layer, coating the substrate layer with an inner electrode layer, coating the inner electrode layer with an electrolyte layer, drying and sintering the coated substrate member such that the substrate member combusts, coating the electrolyte layer with an outer electrode layer, and then drying and sintering the layers. The invention further relates to a method of manufacturing a tubular solid oxide fuel cell assembly comprising: a) coating a tubular substantially metallic support layer with a ceramic or cermet inner electrode layer, b) coating the inner electrode layer with a ceramic electrolyte layer; c) coating the electrolyte layer with a ceramic or cermet outer electrode layer, then d) sintering the layers to produce a hollow tubular metal-supported fuel cell; the electrode and electrolyte layers having a collective wall thickness of 80 μm or less, the support layer having sufficient mechanical strength to support the electrode and electrolyte layers and sufficient porosity to flow a reactant therethrough.

13 Claims, 7 Drawing Sheets

U.S. PATENT DOCUMENTS

| | | |
|---|---|---|
| 4,490,444 A | 12/1984 | Isenberg |
| 4,567,117 A | 1/1986 | Patel et al. |
| 4,664,986 A | 5/1987 | Draper et al. |
| 4,728,584 A | 3/1988 | Isenberg |
| 4,729,931 A | 3/1988 | Grimble |
| 4,791,035 A | 12/1988 | Reichner |
| 5,002,647 A | 3/1991 | Tanabe et al. |
| 5,077,148 A | 12/1991 | Schora et al. |
| 5,103,871 A | 4/1992 | Misawa et al. |
| 5,244,752 A | 9/1993 | Zymboly |
| 5,273,837 A | 12/1993 | Aitken et al. |
| 5,302,319 A | 4/1994 | Wright et al. |
| 5,342,704 A | 8/1994 | Vasilow et al. |
| 5,380,500 A | 1/1995 | Hansen et al. |
| 5,458,989 A | 10/1995 | Dodge |
| 5,518,827 A | 5/1996 | Matsumura et al. |
| 5,763,114 A | 6/1998 | Khandkar et al. |
| 5,807,642 A | 9/1998 | Xue et al. |
| 5,827,620 A | 10/1998 | Kendall |
| 5,908,713 A | 6/1999 | Ruka et al. |
| 5,935,727 A | 8/1999 | Chiao |
| 5,942,348 A | 8/1999 | Jansing et al. |
| 5,952,116 A | 9/1999 | Blum et al. |
| 5,976,721 A | 11/1999 | Limaye |
| 5,993,985 A | 11/1999 | Borglum |
| 5,993,989 A | 11/1999 | Baozhen et al. |
| 6,001,501 A | 12/1999 | Collie |
| 6,007,932 A | 12/1999 | Steyn |
| 6,017,646 A | 1/2000 | Prasad et al. |
| 6,051,173 A | 4/2000 | Fasano et al. |
| 6,051,330 A | 4/2000 | Fasano et al. |
| 6,074,771 A | 6/2000 | Cubukcu et al. |
| 6,080,501 A | 6/2000 | Kelley et al. |
| 6,099,985 A | 8/2000 | Elangovan et al. |
| 6,183,897 B1 | 2/2001 | Hartvigsen et al. |
| 6,194,335 B1 | 2/2001 | Crome et al. |
| 6,207,311 B1 | 3/2001 | Baozhen et al. |
| 6,214,490 B1 | 4/2001 | Pate |
| 6,217,822 B1 | 4/2001 | Borglum |
| 6,238,819 B1 | 5/2001 | Cahill et al. |
| 6,312,847 B1 | 11/2001 | Tsukuda et al. |
| 6,338,913 B1 | 1/2002 | Eshraghi |
| 6,383,350 B1 | 5/2002 | Sehlin et al. |
| 6,399,232 B1 | 6/2002 | Eshraghi |
| 6,403,248 B1 | 6/2002 | Eshraghi |
| 6,403,517 B1 | 6/2002 | Eshraghi |
| 6,605,316 B1 | 8/2003 | Visco et al. |
| 6,824,907 B2 * | 11/2004 | Sarkar et al. ............ 429/31 |
| 6,846,588 B2 * | 1/2005 | Sarkar ................... 429/31 |
| 6,893,762 B2 * | 5/2005 | Sarkar et al. ............ 429/31 |
| 6,936,367 B2 * | 8/2005 | Sarkar et al. ............ 429/31 |
| 7,235,321 B2 * | 6/2007 | Sarkar et al. ............ 429/31 |
| 2002/0028367 A1 | 3/2002 | Sammes et al. |
| 2002/0048699 A1 | 4/2002 | Steele et al. |
| 2003/0134169 A1 | 7/2003 | Sarkar et al. |
| 2003/0134170 A1 | 7/2003 | Sarkar et al. |
| 2003/0134176 A1 | 7/2003 | Sarkar et al. |

FOREIGN PATENT DOCUMENTS

| | | |
|---|---|---|
| EP | 0678597 A1 | 10/1995 |
| EP | 0713931 A2 | 5/1996 |
| EP | 0713931 A3 | 5/1996 |
| JP | 10158894 | 6/1998 |
| WO | WO 99/17390 | 4/1999 |
| WO | WO 01/24300 A1 | 4/2001 |
| WO | WO 01/28011 A1 | 4/2001 |
| WO | WO 01/09968 A | 8/2001 |
| WO | WO 01/86030 A | 11/2001 |
| WO | WO 03/062503 | 7/2003 |
| WO | WO 03/069705 | 8/2003 |

OTHER PUBLICATIONS

Sep. 3, 2004, Written Opinion.
Oct. 6, 2004, Reply to Written Opinion.
Nov. 11, 2004, International Preliminary Examination Report.

* cited by examiner

METAL-SUPPORTED TUBULAR FUEL CELL

This application is a continuation of U.S. patent application Ser. No. 10/207,668, filed Jul. 25, 2002, now U.S. Pat. No. 6,893,762, which is a continuation-in-part of U.S. patent application Ser. No. 10/156,755, filed May 23, 2002, now U.S. Pat. No. 6,936,367, which is a continuation-in-part of U.S. patent application Ser. No. 10/078,548, filed Feb. 14, 2002, now U.S. Pat. No. 6,824,907, which is a continuation-in-part of U.S. patent application Ser. No. 10/053,241, filed Jan. 16, 2002, now U.S. Pat. No. 6,846,588, the entireties of which are incorporated herein by this reference.

FIELD OF THE INVENTION

This invention relates to fuel cells and in particular to metal-supported tubular solid oxide fuel cells, and a method of manufacturing a tubular solid oxide fuel cell on a non-conducting combustible substrate.

BACKGROUND OF THE INVENTION

In general, a solid oxide fuel cell (SOFC) comprises a pair of electrodes (anode and cathode) separated by a ceramic, solid-phase electrolyte. To achieve adequate ionic conductivity in such a ceramic electrolyte, the SOFC operates at an elevated temperature, typically between about 750° C. and 1000° C. The material in typical SOFC electrolytes is a fully dense (i.e. non-porous) yttria-stabilized zirconia (YSZ) which is an excellent conductor of negatively charged oxygen (oxide) ions at high temperatures. Typical SOFC anodes are made from a porous nickel/zirconia cermet while typical cathodes are made from magnesium doped lanthanum manganate ($LaMnO_3$), or a strontium doped lanthanum manganate (also known as lanthanum strontium manganate (LSM)). In operation, hydrogen or carbon monoxide (CO) in a fuel stream passing over the anode reacts with oxide ions conducted through the electrolyte to produce water and/or $CO_2$ and electrons. The electrons pass from the anode to outside the fuel cell via an external circuit, through a load on the circuit, and back to the cathode where oxygen from an air stream receives the electrons and is converted into oxide ions which are injected into the electrolyte. The SOFC reactions that occur include:

Anode reaction:

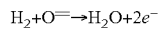

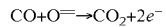

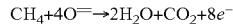

Cathode reaction:

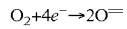

method comprises multiple concentric tubular layers, namely an inner electrode layer, a middle electrolyte layer, and an outer electrode layer. The inner and outer electrodes may suitably be the anode and cathode respectively, and in such case, fuel may be supplied to the anode by passing through the tube, and air may be supplied to the cathode by passing over the outer surface of the tube.

As mentioned, solid oxide fuel cells operate at high temperatures. It is known that decreasing the wall thickness or increasing the conductivity of the electrolyte will enable the fuel cell to operate at lower temperatures. Reducing the overall wall thickness of the fuel cell has additional benefits, such as reducing the thermal mass and increasing the thermal shock resistance of the fuel cell, which contribute to reducing fuel cell start up/shut down time. Furthermore, reducing the wall thickness in conjunction with the overall fuel cell diameter reduces the size of the fuel cell and enables it to operate in small-scale power applications, such as in laptops, cell phones and other small portable electronic devices. Small-scale fuel cell systems, popularly known as "micro fuel cell" systems, that are currently being developed typically employ direct methanol fuel cell (DMFC) or polymer electrolyte membrane (PEM) technologies. Solid oxide fuel cells have characteristics that make them excellent candidates for micro fuel cell applications, such as having one of the highest energy conversion efficiencies of all fuel cell technologies, typically in the order of 35-60%. However, reducing the wall thickness of an SOFC reduces its mechanical strength, and increases its fragility. Known tubular SOFC stack designs all employ relatively large fuel cells, typically having diameters greater than 5 mm. Such fuel cells also have at least one relatively thick layer—e.g. the anode layer in an "anode supported" fuel cell—that provides mechanical support and structural integrity to the fuel cell. Such large-diameter thick-walled SOFC tubes are not particularly suitable for small-scale applications.

It is therefore desirable to provide a fuel cell with a reduced wall thickness. It is also desirable to provide a small-diameter, thin-walled fuel cell that is suitable for small-scale power applications.

SUMMARY OF THE INVENTION

According to one aspect of the invention, there is provided a tubular solid oxide fuel cell comprising a tubular, substantially metallic porous support layer; and a tubular, functional layer assembly in concentric adjacent contact with the support layer. The functional layer assembly comprises in concentric arrangement: a substantially ceramic or cermet inner electrode layer, a substantially ceramic middle electrolyte layer, and a substantially ceramic or cermet outer electrode layer. The functional layer assembly has a wall thickness less than or equal to 80 μm. In particular, the functional layer assembly can have a diameter of less than or equal to 5 mm and a wall thickness less than or equal to 65 μm. More particularly, the functional layer assembly can have a diameter of less than or equal to 2 mm and a wall thickness less than or equal to 20 μm.

The support layer has sufficient mechanical strength to support the functional layer assembly, and sufficient porosity to allow the flow of a reactant therethrough. To support a functional layer assembly having a wall thickness less than or equal to 80 μm, the support layer can have a thickness of between 20 and 500 μm. The support layer can be made of a material selected from the group of stainless steel, ferritic steel, super-alloy, copper, nickel, copper alloys, nickel alloys, a copper-nickel mixture, copper/ceramic cermet, copper alloy/ceramic cermet, copper-silver, and copper-silver-nickel. The support layer can be both in electrical and mechanical contact with the functional layer assembly, and in such case, the support layer has sufficient electrical conductivity to collect current during fuel cell operation. The support layer can either be inside or outside the functional layer assembly; in the former case, the support layer is in mechanical contact with the inner electrode layer, and in the latter case, the support layer is in mechanical contact with the outer electrode layer.

The inner electrode layer can be an anode and have a thickness of between 1 and 20 μm. The outer electrode layer can be a cathode and have a thickness of between 1 and 30 μm.

The electrolyte can be made of a material selected from the group of yittria-stabilized zirconia and $Gd_2O_3$— doped $CeO_2$. When made of yittria-stabilized zirconia, the electrolyte can have a thickness less than or equal to 5 μm. When made of $Gd_2O_3$— doped $CeO_2$, the electrolyte can have a thickness of less than or equal to 15 μm. The electrolyte can contain a certain percentage (0-30%) of nano-sized (less than or equal to 50 nm) electrolyte powder fraction with submicron electrolyte powder to reduce the sintering temperature of the electrolyte. Alternatively, the electrolyte can contain other sintering additives; for example, in a $CeO_2$ system, the additives can be CoO or a mixture of CoO and iron oxide, or CoO and copper oxide mixture, or a mixture of CoO, copper oxide and iron oxide, or a mixture of cobalt and iron, or a mixture of cobalt and copper, or a mixture of cobalt, copper and iron, bismuth oxide, bismuth based (Bi—Sr—Ca—Cu—O) ceramic superconductors or a Bi—Sr—Ca—Cu—O mixture, $YBa_2Cu_3O_x$-ceramic superconductor or Y—Ba—Cu—O mixture for lowering the sintering or densification temperature. These sintering mixtures are expected to have a lower melting temperature than a single material sintering additive.

A fuel cell assembly having such dimensions and compositions are small-diameter thin-walled tubular fuel cell assemblies that are expected to have better thermal shock resistance and mechanical flexibility than larger-diameter thicker-walled ceramic tubular fuel cells. Such a fuel cell is expected to be particularly useful in micro-fuel cell applications.

The fuel cell assembly described above can be assembled with other fuel cell assemblies to form a stack. In particular, the fuel cell stack comprises the fuel cell assembly described above, and a continuous solid phase support matrix embedding the fuel cell and having a porosity sufficient to flow a reactant therethrough and to the outer surface of the embedded fuel cell.

According to another aspect of the invention, there is provided a method of manufacturing a tubular solid oxide fuel cell assembly comprising:

(a) coating a tubular substantially metallic porous support layer with a ceramic or cermet inner electrode layer, (b) coating the inner electrode layer with a ceramic electrolyte layer;

(c) drying and sintering the layers (optional);

(d) coating the electrolyte layer with a ceramic or cermet outer electrode layer, then (e) drying and sintering the outer electrode thereby producing a flexible hollow tubular metal-supported fuel cell;

the electrode and electrolyte layers having a collective wall thickness of 80 μm or less, and the support layer having sufficient mechanical strength to support the electrode and electrolyte layers and sufficient porosity to flow a reactant therethrough.

The inner electrode layer may be coated on the support layer by one in the group of electrophoretic deposition, dip-coating and spraying. The electrolyte layer may be coated on the inner electrode layer by one in the group of electrophoretic deposition, dip-coating, sol-gel coating, and spraying. The metal support layer can contain combustible additives which are combusted during sintering to produce a porous metal support layer. The inner and outer electrolyte can also contain combustible additives which are combusted during sintering to produce porous electrode layers.

According to another aspect of the invention, there is provided a method of manufacturing a tubular solid oxide fuel cell comprising the following steps:

(a) coating a combustible non-conductive substrate member with a conductive substrate layer;

(b) coating the substrate layer with an inner electrode layer by electrophoretic deposition;

(c) coating the inner electrode layer with an electrolyte layer;

(d) drying and sintering the coated substrate member such that the substrate member combusts (optional);

(e) coating the electrolyte layer with an outer electrode layer, and (f) drying and sintering the layers (thereby combusting the substrate member if optional step (d) is not carried out);

thereby producing a hollow tubular fuel cell.

The substrate member composition can substantially comprise a material selected from the group of wood, polymer, paper, and jute fibers, polymer fibers or filaments. The conductive substrate layer composition can substantially comprise a material selected from the group of metal, carbon, and graphite.

When the conductive substrate layer is substantially metallic, it does not combust during sintering, and thus the method produces a fuel cell assembly having a hollow tubular fuel cell lined with a substantially metallic inner layer. To enable reactant to reach the inner electrode of the fuel cell, sufficient combustible additives are added to the metallic substrate layer in step (a) to produce a sufficiently porous metallic layer. The metal can be selected from the group of stainless steel, ferritic steel, super-alloy, Cu, Ni, Cu-alloys, Ni-alloys, Cu—Ni mixture, Cu (or Cu-alloy)/ceramic cermet, Cu—Ni/ceramic cermet, Cu—Ag, and Cu—Ni—Ag. Sufficient metal can be applied to the substrate to produce a metallic substrate layer that can mechanically support the electrode and electrolyte layers during fuel cell operation. Optionally, a sintering can be applied between steps (a) and (b) to combust the substrate; then the metallic substrate layer can be shaped before the fuel cell layers are applied thereon.

When the conductive substrate is carbon or graphite or another combustible material, it combusts during sintering. Between steps (a) and (b), the combustible substrate layer can be coated with a substantially metallic support layer by electrophoretic deposition; this support layer lines the inside of the fuel cell. Additionally or alternatively, the outer electrode can be coated with a substantially metallic support layer. The support layer in both cases has sufficient mechanical strength to support the electrode and electrolyte layers during fuel cell operation. In particular, both support layers can have a thickness of between 20 and 500 μm to provide said mechanical strength. Also, both support layers can include combustible additives that combust during sintering to produce a support layer having sufficient porosity to enable the flow of a reactant therethrough.

DETAILED DESCRIPTION

Figure 1:
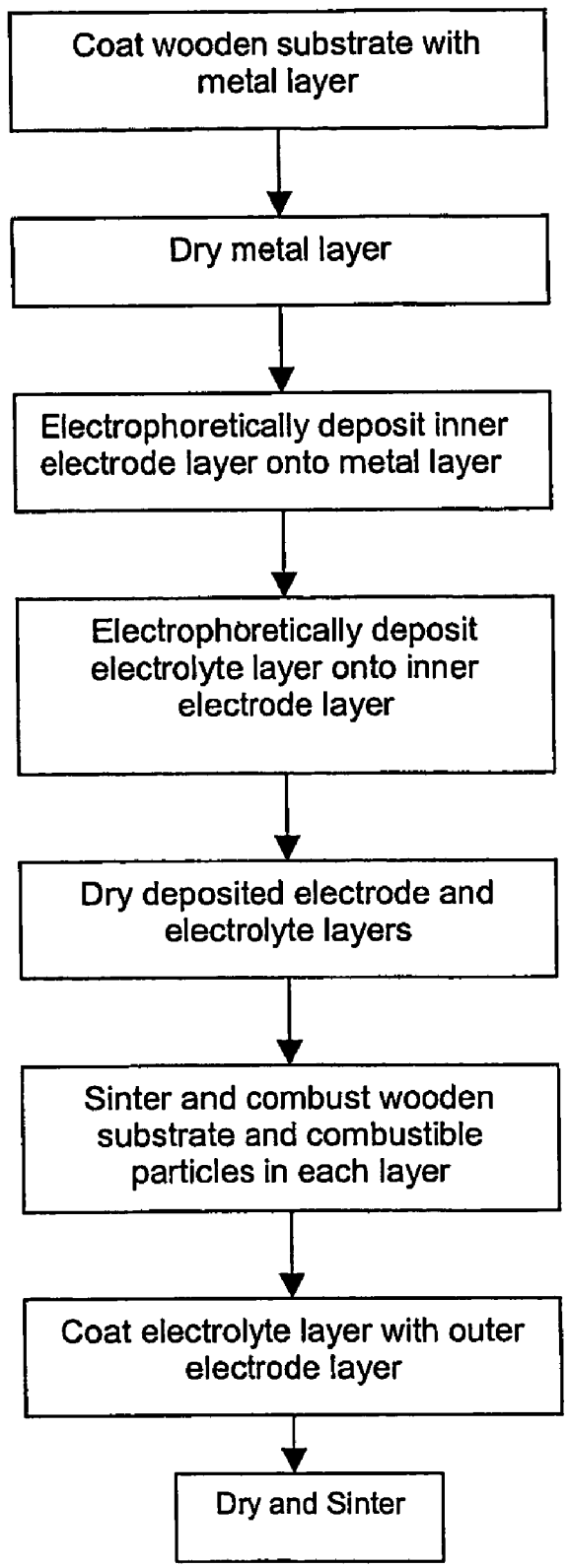
FIG. 1 is a flowchart of the steps in producing a metal-supported tubular SOFC using a wooden rod-like substrate.

When describing the present invention, the following terms have the following meanings, unless indicated otherwise. All terms not defined herein have their common art-recognized meanings.

The term "ceramic" refers to inorganic non-metallic solid materials with a prevalent covalent or ionic bond including, but not limited to metallic oxides (such as oxides of aluminum, silicon, magnesium, zirconium, titanium, chromium, lanthanum, hafnium, yttrium and mixtures thereof) and nonoxide compounds including but not limited to carbides (such as of titanium tungsten, boron, silicon), silicides (such as molybdenum disicilicide), nitrides (such as of boron, aluminum, titanium, silicon) and borides (such as of tungsten, titanium, uranium) and mixtures thereof; spinels, titanates (such as barium titanate, lead titanate, lead zirconium titanates, strontium titanate, iron titanate), ceramic super conductors, zeolites, and ceramic solid ionic conductors (such as yttria stabilized zirconia, beta-alumina and cerates).

The term "cermet" refers to a composite material comprising a ceramic in combination with a metal, typically but not necessarily a sintered metal, and typically exhibiting a high resistance to temperature, corrosion, and abrasion.

The term "porous" in the context of hollow ceramic, metal, and cermet membranes and matrices means that the material contains pores (voids). Therefore, the density of the porous material is lower than that of the theoretical density of the material. The voids in the porous membranes and matrices can be connected (i.e., channel type) or disconnected (i.e. isolated). In a porous hollow membrane or matrix, the majority of the pores are connected. To be considered porous as used herein in reference to membranes, a membrane should have a density which is at most about 95% of the theoretical density of the material. The amount of porosity can be determined by measuring the bulk density of the porous body and from the theoretical density of the materials in the porous body. Pore size and its distribution in a porous body can be measured by mercury or non-mercury porosimeters, BET or microstructural image analysis as is well known in the art.

According to one embodiment of the invention, there is provided a method of manufacturing a metal-supported tubular micro-solid oxide fuel cell (µ-SOFC) assembly. The fuel cell assembly has a support layer and three functional layers, namely: an inner electrode membrane, a middle electrolyte membrane, and an outer electrode membrane. The electrodes serve as a current collector and promote electrochemical reaction. The electrolyte allows oxygen Ions to pass from one electrode (cathode) to the other (anode), and is impermeable to nitrogen in air and fuel gas flows on either side of the electrolyte. The functional layers are mechanically supported by a tubular metal support layer, which in this embodiment is the inner layer of the fuel cell assembly. However, the metal support layer may be located elsewhere on the fuel cell, e.g. concentric to and outside of the functional layers.

Figure 6:
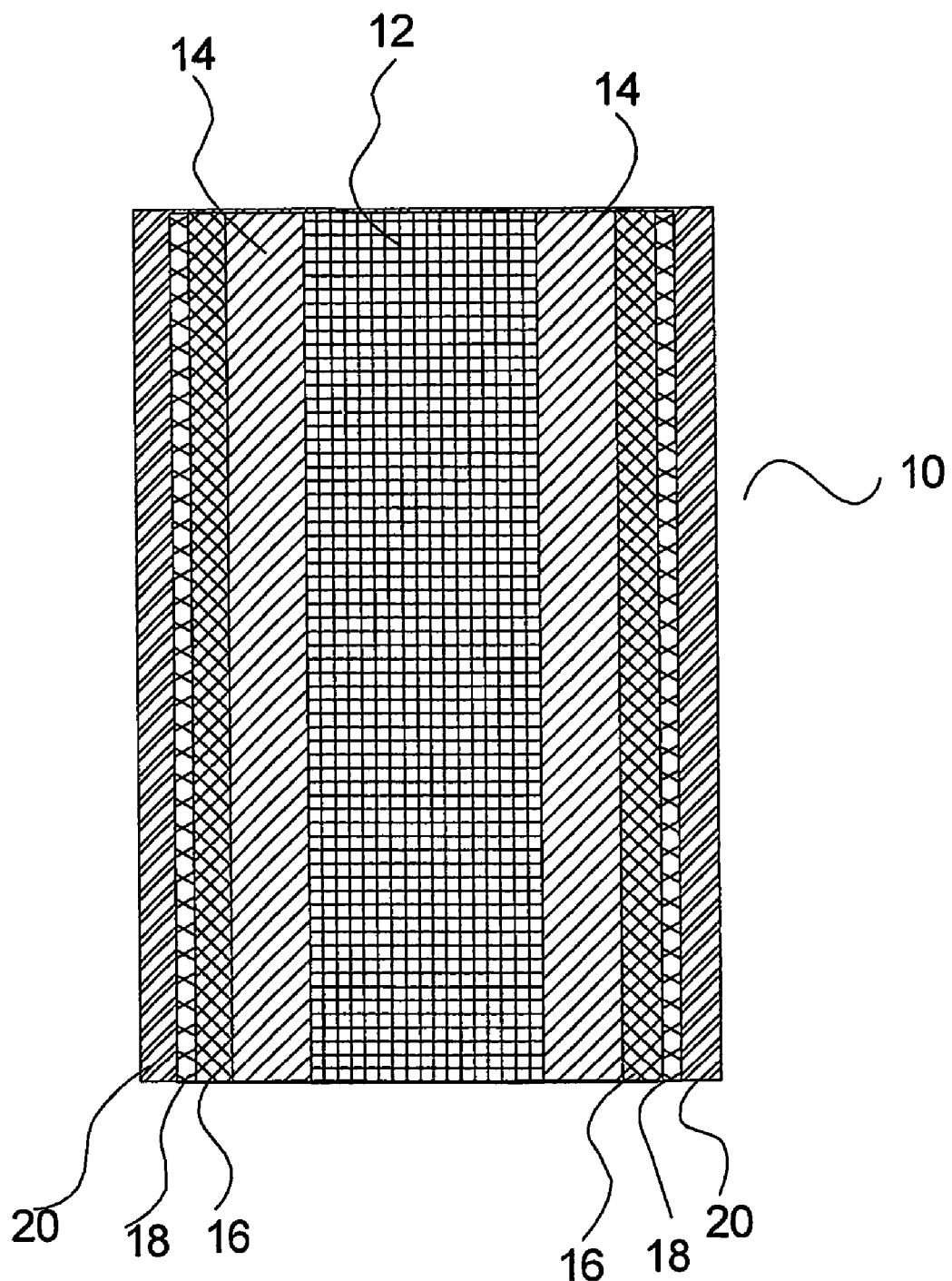
FIG. 6 is a schematic side section view of a fuel cell produced by the method illustrated in FIG. 1.

Referring to FIGS. 1 and 6, a fuel cell assembly 10 is produced by coating successive layers onto a wooden substrate 12. The substrate 12 serves as a template for the fuel cell assembly 10 and thus has a shape and size selected to correspond to desired shape and size of the fuel cell assembly 10 to be produced. In this described embodiment, the wooden substrate 12 is used to produce a tubular small-diameter SOFC and thus is an elongate rod having a circular cross-section and a diameter in the range of 0.1 to 10 mm. The substrate 12 is particularly suitable for producing tubular µ-SOFCs having a diameter of less than or equal to 5 mm. Wood is selected for its low cost and its combustibility at sintering temperatures. However, other relatively inexpensive combustible materials such as polymer, paper, or jute/polymer fibers, having similar shapes and sizes may be used as the substrate 12.

The wooden substrate 12 is first coated with a conductive metallic support layer 14. A suitable method of coating the wooden substrate 12 is by dip-coating the wooden substrate 12 in a container of liquid metal-containing mixture, as is known in the art. Alternatively, the mixture may be applied by spray coating or brush painting, as is known in the art. The mixture includes one or more metals that are conductive and capable of withstanding typical SOFC operating conditions. Suitable metals include nickel, copper, silver, silver alloys (e.g. silver nickel alloy, silver copper alloy, silver-copper-nickel alloy), stainless steel, ferritic steel, and super alloy (e.g. Inconel), copper-alloys, nickel-alloys, a copper-nickel mixture, a copper (or copper-alloy)/ceramic cermet, copper-nickel/ceramic cermet, and a copper-nickel-silver/ceramic cermet. The mixture also includes 3-60 vol. % combustible additives that combust during sintering to make the metallic layer 14 porous; depending on the amount of combustible additives used, the porosity varies between 20 and 75 vol. %. Such porosity enables reactant (i.e. oxidant or fuel) to flow through the support layer 14 and to an adjacent electrode during fuel cell operation. In particular, a mixture having 30 vol. % combustible additive produces a metal support layer having a porosity of about 40 vol. %. Examples of suitable combustible additives include: particles of carbon, graphite, corn starch, tapioca stretch, rice flower, wooden particles or saw dust, and polymer particles.

Optionally, the substrate 12 can be coated with a polymer binder solution before the support layer 14 is applied, to enhance the smoothness and reduce the porosity of the substrate surface. For substrates made of jute or polymer fibres, the binder solution is also useful to close inter-fibre gaps. Suitable such polymer binder solutions include a solution of about 5 vol. % poly-vinyl-butyral dissolved in either water or an alcohol, and a solution of about 5 vol. % nitrocellulose dissolved in acetone.

Optionally, the mixture can include a ceramic material such as cerium oxide. Such ceramic material is added to introduce catalytic activity in the support layer 14, e.g. to reform a hydrocarbon inside an anode. The ceramic content in the support layer 14 should not exceed the percolation limit of the ceramic, i.e. the threshold at which ceramic becomes a continuous phase in the metal and causes the support layer 14 to become brittle. The ceramic percolation limit is about 35 vol. %. Therefore, the support layer composition consists of metal with the balance being ceramic between 0 vol. % to the ceramic percolation limit; such a support layer 14 is hereby defined to be a "substantially metallic" support layer 14.

Generally, sufficient metallic mixture is applied to the substrate 12 to produce a substantially metallic support layer 14 having sufficient mechanical strength to support a thin-walled tubular µ-OFC during typical SOFC operating conditions. For example, to support a µ-SOFC having a diameter of 2 mm and a wall thickness 80 μm or less, a suitable support layer 14 is made of Inconel or stainless steel and has a thickness in the order of 20-500 μm and preferably around 200 μm.

After the wooden (or polymer or paper or jute/polymer fibers) substrate 12 is coated with the support layer 14, the support layer 14 is allowed to dry. Then, functional layers are successively applied to produce a fuel cell assembly 10 having multiple concentric layers of material. "Functional layers" means the electrodes and the electrolyte of the fuel cell assembly 10, and in particular excludes the support layer 14. The support layer 14 provides structural support to the functional layers, as well as collecting current.

The first functional layer applied onto the support layer 14 is the inner electrode layer 16, and this layer is applied by electrophoretic deposition (EPD). In this connection, the support layer 14 serves as a conductive surface which enables the inner electrode layer 16 to be applied by EPD. The process of coating by EPD has been previously described in Applicant's published PCT application no. PCT/CA01/00634. EPD is a particularly desirable method of forming the functional layers, as it enables the formation of very thin layers; however, other processes known in the art that are able to form very thin functional layers may also be used. The inner electrode layer 16 may serve as the anode of the fuel cell 10, and as such, is porous, made of a nickel (or copper) and zirconia (or ceria) cermet having a thickness of between 1 μm to 20 μm and preferably about 5 μm. Prior to the EPD, the anode material is in the form of a slurry; the slurry can include combustible particles that combust during sintering, thereby increasing the porosity of the anode structure. The concentration and distribution of the combustible particles in the inner electrode layer 16 are selected to provide the inner electrode layer 16 with a porosity greater than or equal to 15 vol. %, and preferably around 30 vol. %.

After the inner electrode layer 16 has been applied, a second functional layer 18 is applied onto the inner electrode layer 16; this layer 18 serves as the electrolyte of the fuel cell assembly 10. In order to reduce the operating temperature of the fuel cell assembly 10, and in particular to lower the operating temperature to or below 700° C., a high conductivity electrolyte material is selected, such as $Gd_2O_3$ doped-$CeO_2$. An electrolyte having such a composition may be applied onto the anode layer by EPD to a thickness of 15 μm or less. Alternatively, a lower fuel cell operating temperature may be achieved without the use of a high conductivity electrolyte, by reducing the thickness of the electrolyte layer 18. In such case, an electrolyte layer 18 made of yttria-stablized zirconia (YSZ) having a thickness of less than or equal to 5 μm, and preferably around 2 μm may be used to produce a fuel cell 10 that is operable at around 700° C. or less. To apply such a thin layer of electrolyte, a sol-gel dip-coating technique is used as is known in the art.

Prior to application onto the inner electrode layer 16, the electrolyte material is in the form of a slurry; the slurry includes a sintering additive that enables the electrolyte layer 18 to achieve full density at a reduced sintering temperature; such reduced sintering temperature is necessary to avoid melting or over-sintering the metallic support layer 14. The sintering additive can be a certain weight percentage (0-30%) of nano-sized (less than or equal to 50 nm) electrolyte powder fraction with submicron electrolyte powder. Alternatively, the electrolyte can contain other sintering additives; for example, in a $CeO_2$ system, the additives can be cobalt oxide; or a mixture of cobalt oxide and iron oxide; or cobalt oxide and copper oxide mixture; or a mixture of CoO, copper oxide and iron oxide; or a mixture of cobalt and iron; or mixture of cobalt and copper; or a mixture of cobalt, copper and iron; bismuth oxide; bismuth based (Bi—Sr—Ca—Cu—O) ceramic superconductors; or a Bi—Sr—Ca—Cu—O mixture; $YBa_2Cu_3O_x$-ceramic superconductor; or a Y—Ba—Cu—O mixture. The maximum weight percentage of above sintering additives is 10%. These sintering mixtures are expected to have a lower melting temperature than a single-material sintering additive.

After the anode and electrolyte layers 16, 18 have been applied, they are allowed to dry. Then, the wooden substrate 12 and support and functional layers 14, 16, 18 are sintered at a temperature sufficient to burn out the combustible wooden substrate 12 as well as any combustible additives in the coatings 14, 16, 18 but not melt the metallic support layer 14. The sintering also enables the electrolyte layer 18 to achieve full density while maintaining the porosity of the inner electrode layer 16 and the support layer 14. The sintering cycle for a zirconia deposit where the sintering atmosphere is air or inert (nitrogen or argon) or reducing (hydrogen or hydrogen and inert gas mixture) may begin by raising the temperature to about 500° C. to about 800° C. at a heating rate of between 20° C./hr to 300° C./hr and preferably over a period of about 6 hours to about 9 hours and held at that temperature for about 3 hours. The temperature may then be raised at a rate of about 100° C. to about 300° C. per hour to the sintering temperature of about 800° C. to about 1400-C and held there for about 0.5 to about 5 hours. The temperature may then be lowered at a rate of about 100° C. to about 300° C. per hour to room temperature. After sintering, the sintering additives in the electrolyte layer may remain as a separate phase like cobalt oxide, iron oxide or copper oxide. Or, they may dissolve in the $CeO_2$ of a $Gd_2O_3$ doped-$CeO_2$ electrolyte, or they may chemically react with $CeO_2$ and form a compound.

After sintering, the electrolyte layer 18 is coated with a third functional layer, namely, an outer electrode layer 20. As the inner electrode layer 16 in this embodiment is the anode, the outer electrode layer 20 serves as the cathode and as such its composition may suitably be LSM, or a LSM/doped-zirconia mixture, or a LSM/doped-ceria mixture, or another electrically and ionically conductive ceramic material. The outer electrode layer 20 may be applied to the electrolyte layer 18 by any suitable known means, including but not restricted to EPD (provided the electrolyte layer is made conductive, e.g. by coating with a conductive layer, e.g painting the electrolyte layer with a graphite paint), dip-coating, brushing, spraying or sol-gel coating. The coating thickness is between 1 and 30 μm and preferably around 10 μm. Like the anode layer 16, combustible particles can be added to the cathode slurry that are combusted during sintering to increase the porosity in the porous cathode layer 20.

After the outer electrode layer 20 has been applied to the electrolyte layer 18, the fuel cell assembly 10 is subjected to a drying stage wherein heat is applied at increasing temperatures of 40° C., 60° C., 80° C., 100° C., 120° C., and 140° C. The outer electrode layer 20 may be heated at each temperature for a period between 10 minutes to 5 hours. Then, a final sintering stage is applied to partially densify the outer electrode layer 20, to bond the outer electrode layer 20 to the electrolyte layer 18, and to combust any combustible particles in the outer electrode layer 18. The sintering cycle where the sintering atmosphere is air may begin by raising the temperature from room temperature to a first temperature of about 200-250° C., then to a second temperature between about 400-600° C., then to a third temperature between about 800-900° C., then finally to a temperature of between 800 to 1100° C. The heating rate for each of these sintering steps is between about 20-300° C./hr. The outer electrode layer 20 is held at each of these temperatures for between about 15 minutes to 5 hours. The temperature may then be lowered at a rate of about 60-300° C. per hour to room temperature.

The fuel cell assembly 10 that is produced as a result of these steps is a hollow elongate tubular structure. The cross-section of this tubular structure is generally circular, but it is within the scope of the invention for the cross-section to have other shapes, such as square, hexagonal etc. The fuel cell assembly 10 has multiple concentric layers of material, namely, the substantially metallic inner support layer 14, and a functional layer assembly in concentric adjacent contact with the support layer; the functional layer assembly comprises the inner electrode layer 16 having a ceramic or cermet composition, the middle electrolyte layer 18 having a ceramic composition, and the outer electrode layer 20 having a ceramic or cermet composition. The functional layer assembly is extremely thin compared to state of the art tubular fuel cells, generally having a wall thickness less than or equal to 80 µm and in particular, in the order of around 25 µm, and as such gives the fuel cell assembly 10 extremely high thermal shock resistance, very rapid start up time (i.e. time to heat up to operating temperature), and a degree of elasticity that gives the fuel cell assembly 10 better mechanical shock resistance than thicker-walled ceramic fuel cells. This last characteristic is particularly important where the fuel cell assembly 10 is to be used in adverse conditions where the components of a fuel cell system may be subjected to vibration and other mechanical shocks. A major problem with anode supported NiO(Ni)-zirconia substrate is the dimension change associated with the oxidation and reduction of NiO/Ni. Oxidation of Ni of a cell results volume expansion on the anode substrate and introduce tension on the electrolyte layer and as a result microcracking occurs in the electrolyte layer. Particularly this is a critical during cooling of a SOFC from its operating temperature; any air leak can essentially damage the electrolyte of the cell. Since present design replaces an anode-supported fuel cell having a relatively thick anode wall by a metal-supported SOFC, problems associated with oxidation-reduction is reduced or avoided altogether. Furthermore, the metal support layer 14 of the fuel cell assembly 10 can be welded to other parts of a fuel cell system, thereby giving further design options when designing a fuel cell system.

According to another embodiment of the invention, the fuel cell 10 may be manufactured by a method having only one sintering step. This method involves the same steps as the two-sintering method described above, except that the first sintering step is omitted, and the second sintering step is modified in such a way that during sintering, the outer electrode does not chemically react in an appreciable manner with the electrolyte layer, and after sintering, the porosity of outer layer is more than 20% of volume and final fuel cell can effectively convert chemical energy to electrical energy.

Figure 7B:
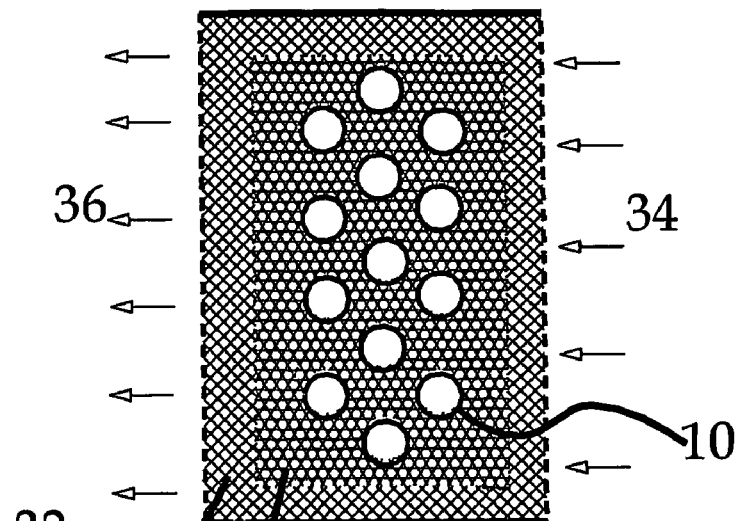
FIGS. 7(a) and (b) are schematic plan and end views of a fuel cell stack having a plurality of the fuel cells of FIG. 6.
Figure 7A:
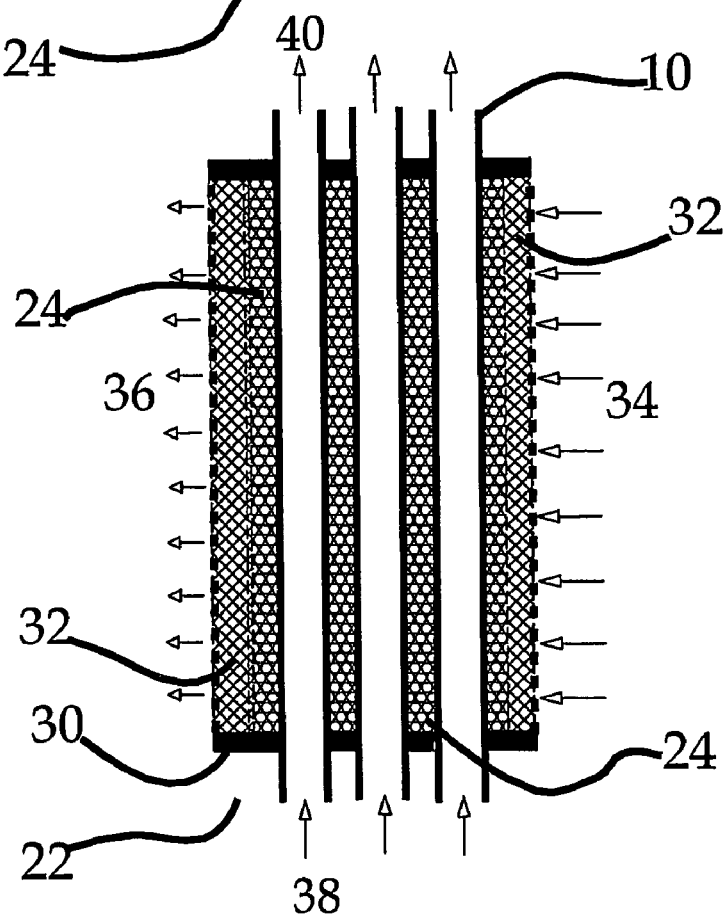

Referring to FIG. 7, the fuel cell assembly 10 may be assembled with other like fuel cells assemblies 10 in a stack 22 by arranging the fuel cells assemblies 10 in a substantially parallel, longitudinally-extending tightly packed array and embedding the fuel cells assemblies 10 in a in a continuous solid phase porous foam support matrix 24. The matrix 24 is made from ceramic or another material that is able to withstand typical SOFC operating temperatures, e.g. steel or a superalloy. The support matrix 24 can be made of LSM to enable it to operate at up to around 1000° C. and to serve to collect current, to ionize oxygen into oxide ions, and to conduct these ions to the electrolyte. The support matrix 24 fills the spaces between the fuel cell assemblies 10 and contacts the outer surface of each fuel cell assembly 10, i.e. the cathode layer of each fuel cell 10. The support matrix 24 can be the same material as the cathode layer, thereby serving to increase the effective surface area of the cathode, and increasing the area for collecting electrons, and ionizing oxygen.

Instead of LSM, the support matrix 24 can be made of any suitable electronic or mixed (electronic and ionic) conductive porous solid state material. When made from an electronic conductive material (e.g. metal), the support matrix 24 can carry electricity by electron transportation. When made from a mixed conductor material (e.g. LSM or metal/ceramic composite), the support matrix 24 can carry electricity by electron and ion transportation. When made from an ionic conductor material (e.g. Yittria-doped zirconia), the support matrix 24 can carry electricity by ion transportation. Suitable alternative materials for the matrix include: doped $LaCrO_3$ (e.g. $La_{1-x}Sr_xCrO_3$, $La_{1-x}Ca_xCrO_3$, $La_{1-x}Mg_xCrO_3$, $LaCr(Mg)O_3$, $LaCa_{1-x}Cr_yO_3$), stainless steel (e.g. 316, 316L), cermets such as: Ni-Yittria stabilized zirconia, Ni and doped zirconia cermet, Ni doped-$CeO_2$ cermet, Cu doped-ceria cermet, silver-(Bi—Sr—Ca—Cu—O)-oxide cermet, silver-(Y—Ba—Cu—O)-oxide cermet; silver-alloy-(Bi—Sr—Ca—Cu—O)-oxide cermet; silver-alloy-(Y—Ba—Cu—O)-oxide cermet; silver and its alloys, Inconel steel or any super alloy, ferritic steel, SiC, and $MoSi_2$.

When the support matrix 24 is made entirely of steel or a superalloy, it serves to provide mechanical support to hold the fuel cell assemblies 10 together, as well as to serve as a current collector. If the support matrix 24 is made of a steel or a superalloy coated with a catalyst, it serves to provide mechanical support, collect current, and promote chemical reactions, such as ionization. If the support matrix 24 is made of a steel or a superalloy coated with catalyst and an ionic or mixed conductor, it serves to provide mechanical support, collect current, promote chemical reactions, and provide an ionic conduction path.

The support matrix 24 is porous (with channel-type connected pores) to allow the flow through of oxidant through the stack 22, and to the cathode layer 16 of each fuel cell assembly 10. The porosity of the support matrix 24 is selected to provide a sufficient oxidant flow-through rate and sufficient mechanical strength to serve as a support structure for the fuel cell stack 22. In this connection, the support matrix 24 has a porosity of between 30-95% and preferably about 60% As will be described below, the support matrix 24 in this embodiment is a solid foam made by sintering a foam slurry. However, a support matrix 24 can also be made form other materials such as metal wire, or a metal, ceramic or cermet wool.

The stack 22 may be capped at each longitudinal end by respective end plates 30; each end plates is provided with a plurality of openings corresponding to the tubular fuel cells 10, such that the fuel cells extend through the end plates 30. The body of the stack is wrapped by a perforated cover 32 that is permeable to air. In operation, the stack 22 can be assembled in a fuel cell system (not shown) that flows air to one side of the stack 34, through the cover 32, through the porous support matrix 24 and to the outer surface of each fuel cell. Unused air and reaction products are carried out of the stack through the cover 32 on opposite side 36 of the stack 22. Fuel is fed through each fuel cell 10 at one an fuel inlet end 38 of the stack 22 and exits the tubes at a fuel outlet end 40 of the stack 22.

The pumps, controllers, and other ancillary equipment of a fuel cell system are known in the art and are not described here. Also, the fuel cell stack 22 is electrically connected to an external circuit (not shown) as is known in the art.

There are different processes to embed fuel cells 10 in the porous matrix. According to one process, an apparatus (not shown) is provided for immersing a plurality of fuel cells 10 in a slurry of matrix material. The apparatus comprises a pair of end plates made of a ceramic, superalloy or another material capable of withstanding sintering, a combustible flexible sheet, and means for supplying the slurry to the apparatus. The end plates each have a plurality of indentations on one of their major faces; the indentations are shaped and sized to accept the ends of fuel cells 10. The flexible sheet may be made of paper board or a suitable plastic material. Upon sintering (described below), the flexible sheet burns away. Alternatively, the flexible sheet may be replaced by a non-combustible container wall (not shown) of ceramic such as alumina or zirconia, or metal. Such container serves to contain the slurry during heat treatment/sintering, but can also serve as an integral component of the fuel cell stack 22.

Each end of each fuel cell 10 is taped with a protective masking tape (not shown) or a suitable combustible coating to keep the ends free from the slurry. Then, each end plate is clamped to each end of each fuel cell 10, holding each fuel cell in place. Then, the flexible sheet is wrapped around the fuel cells 10; the sheet is large enough to wrap completely around the fuel cells 10 and to attach to each end plate. When wrapped, the sheet and end plates form a cylindrical container that encloses the fuel cells 10. A slurry Injection port is provided in one of the base plates.

The slurry is a suspension of the matrix material, water or organic solvent, a dispersant, a foaming agent, organic monomers and an initiator. The matrix material in this case is LSM (lanthanum strontium manganate), but can be any ceramic and/or metal powder having suitable properties, such as $LaCr(Mg)O_3$, doped-$LaCrO_3$ (e.g. $La_{1-x}Sr)CrO_3$, $La_{1-x}Ca_xCrO_3$, $La_{1-x}Mg_xCrO_3$, $LaCr(Mg)O_3$, $LaCa_{1-x}Cr_yO_3$, $La_{1-x}Sr_xCo_{1-y}F_{-cy}O_3$, (LSM or $LaCr(Mg)O_3$ or doped-$LaCrO_3$ ($La_{1-x}Sr_xCrO_3$, $La_{1-x}Ca_xCrO_3$, $La_{1-x}Mg_xCrO_3$, $LaCr(Mg)O_3$, $LaCa_{1-x}Cr_yO_3$, $La_{1-x}Sr_xCo_{1-y}F_{cy}O_3$,)) plus metals such as silver or stainless steel, ferritic steel or supper alloy or inconel or mixture of silver plus stainless steel or ferritic steel, supper alloy or inconel, stainless steel (316, 316L), cermets such as Ni-Yittria stabilized zirconia or any Ni and doped-$ZrO_2$ cermet, Ni and doped-$CeO_2$ cermet, Cu and doped-$CeO_2$ cermet, Cu—Ni and doped-$CeO_2$ or doped-$ZrO_2$ cermet, silver and its alloys, Inconel steel or any superalloy, or ferritic steel SiC, $MoSi_2$. The organic monomers may be mehty methacrylate, butyl arcylate, acrylamide, or other acrylates. The dispersant may be polyacrylic acid. The foaming agents may be Tergiton TMN10 or Triton X114. The initiator may be ammonium persulphate (APS). The slurry upon heat treatment will produce a foam that has a porous structure wherein the majority of the pores are interconnected to provide continuous fluid pathways. Upon sintering, this foam becomes the solid-state porous support matrix 24 with a foam-like microstructure.

Instead of or in addition to the foaming agent, combustible additives may be added to the slurry, such as polymer powder, organic powder, saw dust and fibres. Upon sintering at a temperature hot enough to combust the combustible additives, the additives burn away, leaving behind the solid-state foam support matrix 24.

Instead of or in addition to the foaming agent and combustible additives, a porous foam-like microstructure can be formed by using hollow ceramic particles. Spherical ceramic particles such as commercially available alumina bubbles ($Al_2O_3$) are first coated with matrix material, e.g. by dipping or spraying the particles with the slurry, or by electroless coating of matrix material onto the particles. Then, the coated particles are placed in a container having a plurality of tubular fuel cells 10 arranged in the desired stack configuration. The container is packed with the particles such that tubular fuel cells 10 are held securely in place. Then, a lid is placed on the container, and the filled container is subjected to a sintering process whereby the coating will bond with the particles thereby physically interconnecting the particles.

The slurry is injected or poured through the slurry port until the container is filled and the fuel cells 10 are immersed with slurry. The slurry is left to completely dry at ambient temperature (or at an elevated temperature up to about 120° C.).

After the slurry has dried, the container and its contents are sintered. The sintering cycle involves first increasing the temperature from ambient to 200° C. for and holding at that temperature 1-10 hours, then increasing the temperature to 500° C. and holding at that temperature for 1-10 hours, then increasing the temperature to 650° C. and holding at that temperature for 1-10 hours, then increasing the temperature to 800° C. and holding at that temperature for 1-10 hours, then finally increasing the temperature to 800-1250° C. and holding at that temperature for 0.25 to 5 hours. The rate of temperature increase in each step is between 20-300° C. The temperature Is then allowed to drop to ambient temperature at a rate of between 60-300° C.

During sintering, the combustible flexible sheet is burned away, leaving behind a fuel cell stack 22 having the fuel cells 10 embedded in the solidified porous support matrix 24 such that the matrix 24 surrounds the length of each embedded fuel cell 10 (because the ends of the fuel cells 10 are masked prior to coating with slurry, they are free of the matrix 24). The end plates are then removed, and the stack 22 is ready for combining with other components to produce a fuel cell system.

Figure 2:
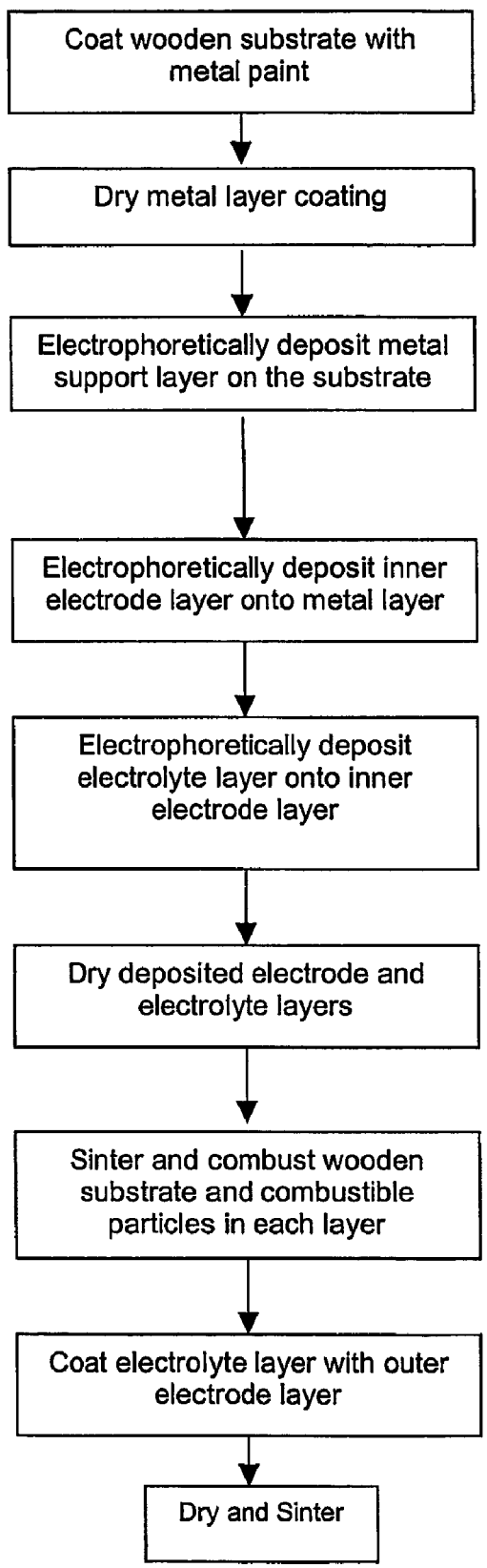
FIG. 2 is a flowchart of the steps in producing a metal-supported tubular SOFC using a wooden rod-like substrate that is coated first with a first metal layer by painting, then by a second metal layer by electrophoretic deposition.

According to another embodiment of the invention and referring to FIG. 2, a metal supported tubular SOFC is produced in a manner similar to the method described in the first embodiment, except that prior to applying the first functional layer, the wooden (or polymer or paper or jute/polymer fibers) substrate 12 is first coated with a thin layer of metal paint (thinner than the metal support layer in the first embodiment), then another metallic layer 14 is applied over the metal paint by EPD. The total thickness of the two-layered metal support coating is in the range of 20 to 500 μm. In general, coating by EPD offers a better surface interface finishing and better microstructural homogeneity than comparable methods of metal layer coating.

Figure 3:
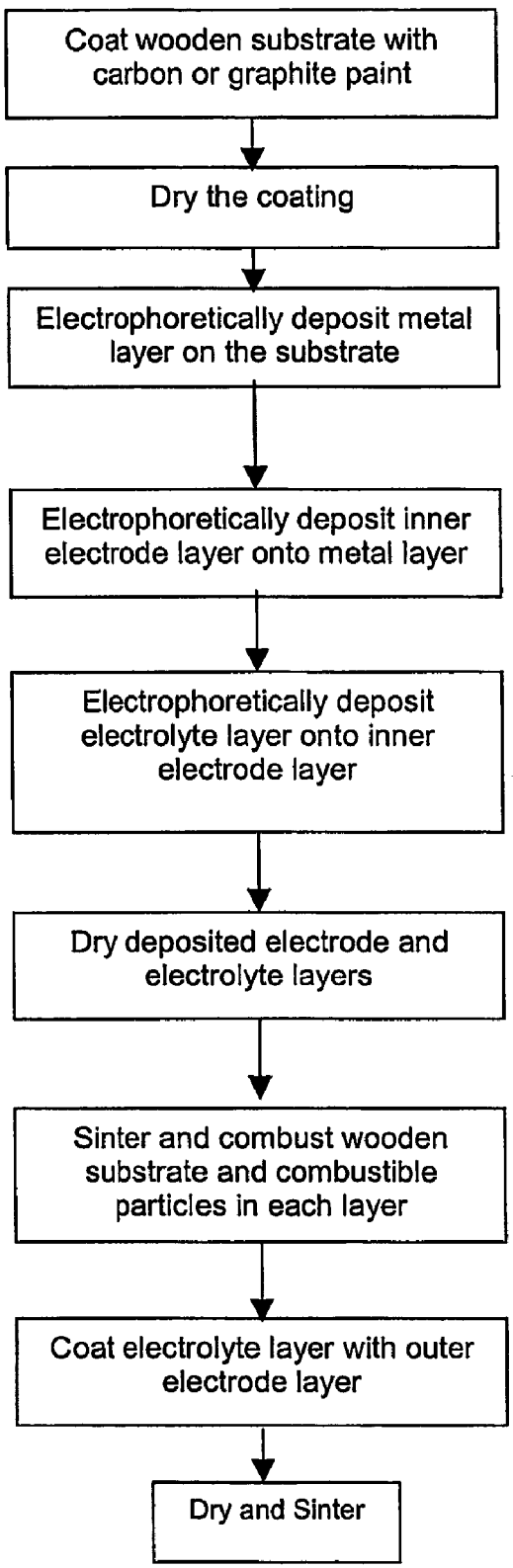
FIG. 3 is a flowchart of the steps in producing a metal-supported tubular SOFC using a wooden rod-like substrate coated with a carbon or graphite layer.

According to another embodiment of the Invention and referring to FIG. 3, a metal supported tubular SOFC is produced in a manner similar to the method described in the first embodiment, except that prior to applying the first functional layer, the wooden (or polymer or paper or jute/polymer fibers) substrate 12 is first coated with a layer carbon or graphite paint, then coated with a metal support layer by EPD. The carbon or graphite layer makes the wooden (or polymer or paper or jute/polymer fibers) substrate 12 conductive, thereby enabling the metallic layer 14 to be applied thereon by EPD. The carbon or graphite layer will be combusted along with the wooden core during sintering.

According to another embodiment of the invention, a tubular SOFC is produced in a manner similar to the method described in the first embodiment, except that instead of applying a substantially metallic layer 14 onto the substrate 12, the substrate 12 is coated with a layer carbon or graphite paint. The carbon or graphite layer makes the wooden (or polymer or paper or jute/polymer fibers) substrate 12 conductive, thereby enabling the inner electrode layer 16 to be applied thereon by EPD. The other functional layers 18, 20 are applied as described above in the first embodiment. A sintering then takes place and the carbon or graphite layer will be combusted along with the wooden core during sintering, leaving behind a tubular fuel cell. The fuel cell may be anode-, electrolyte-, or cathode-supported as is known in the art. For example, in an anode-supported fuel cell, a NiO/doped-zirconia (or doped-ceria) anode support layer is applied to the carbon or graphite layer, then an anode functional layer is applied on the anode support layer, then an electrolyte (doped-zirconia or doped-ceria) layer is applied on the anode functional layer, then the layers are sintered (optional), then an outer electrode is applied to the electrolyte layer, and finally the layers are sintered. Or, the fuel cell can be thin-walled (less then 80 μm) and have a metal support layer 14 surrounding and attached to the outer electrode. In this latter case, a substantially metallic layer is applied to the outside of the outer electrode layer 20. A sintering then takes place and the carbon or graphite layer will be combusted along with the wooden core during sintering, leaving behind a fuel cell assembly having its metallic support layer 14 on the outside of the functional layers 16, 18, 20. Instead of carbon or graphite paint, other conductive combustible layers as known to one skilled in the art may be applied to the substrate 12, such as, electrically conductive polymers and other organic materials.

Figure 4:
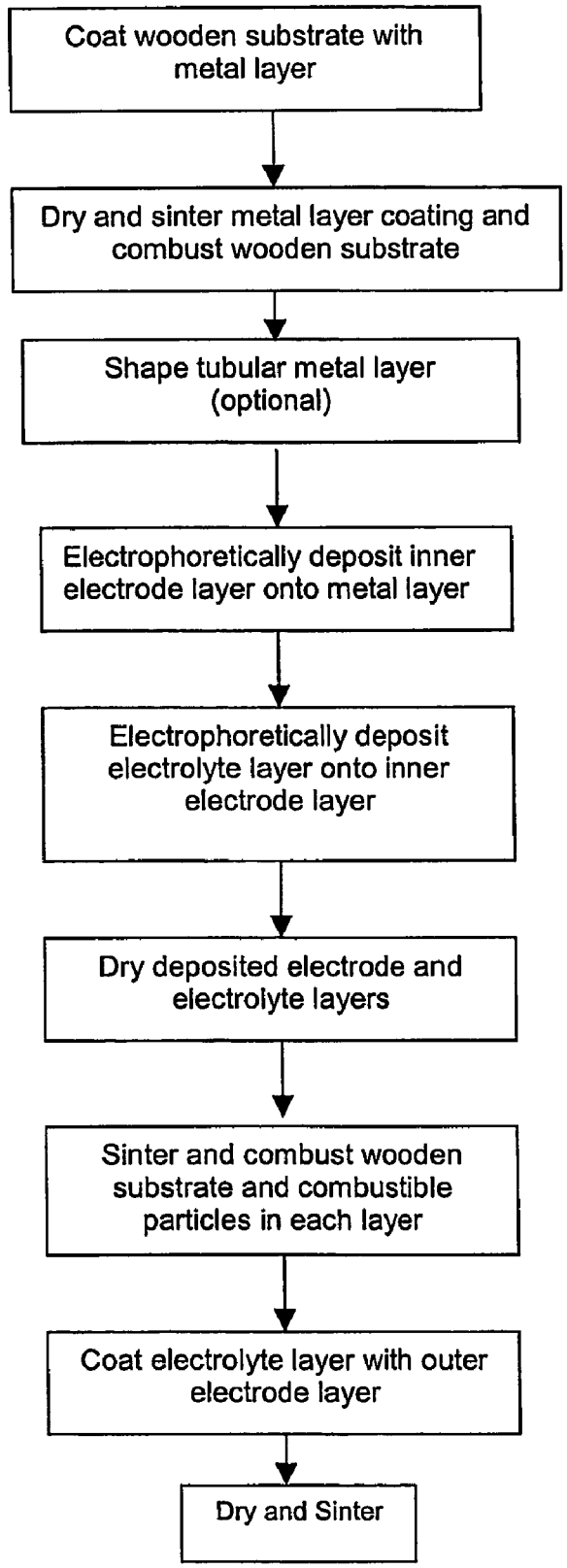
FIG. 4 is a flowchart of the steps in producing a metal-supported tubular SOFC that includes shaping the fuel cell into a non-elongate configuration.

According to another embodiment of the invention and referring to FIG. 4, a metal supported tubular SOFC is produced in a manner similar to the method described in the first embodiment, except that after the metallic layer 14 applied to the wooden (or polymer or paper or jute/polymer fibers) substrate 12 has dried and before the first functional layer is applied, the metal coated wooden (or polymer or paper or jute/polymer fibers) substrate 12 is sintered. This burns away the wooden (or polymer or paper or jute/polymer fibers) substrate 12, leaving behind a thin tubular metallic layer 14, that can be optionally shaped into different fuel cell configurations, e.g. "U" shaped, or coil shaped. After such shaping, the functional layers are applied to the metallic layer 14 as described above.

Figure 5:
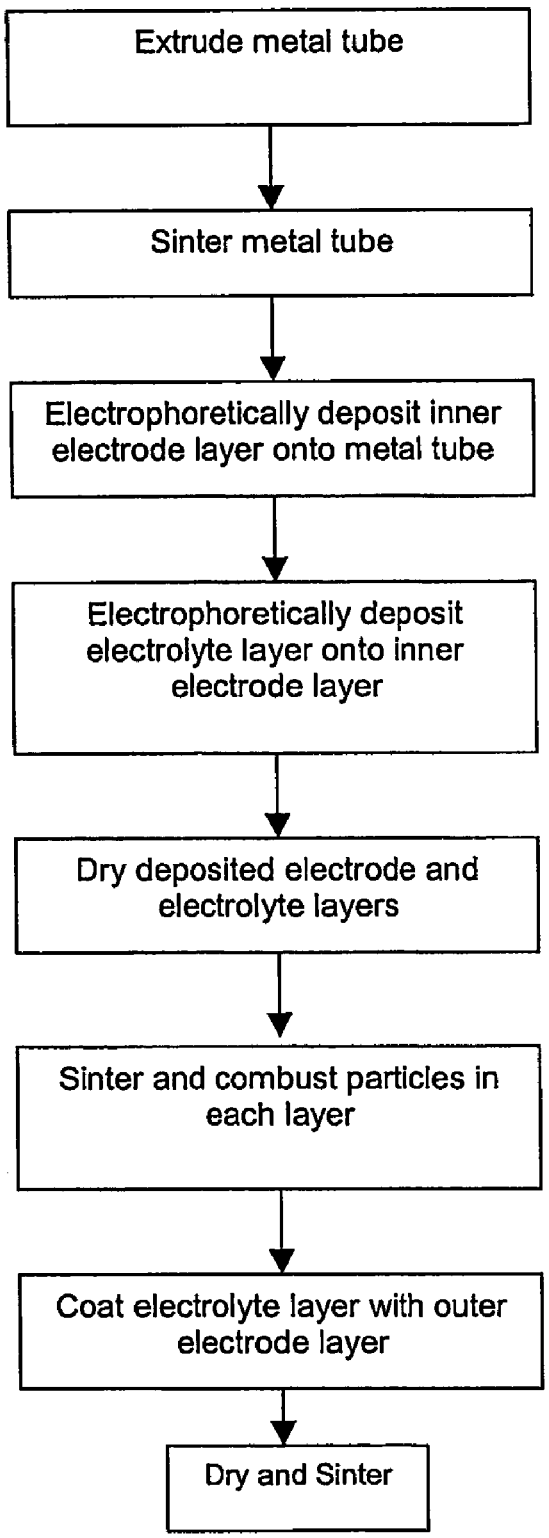
FIG. 5 is a flowchart of the steps in producing a metal-supported tubular SOFC using an extruded metal tube as a support layer of the fuel cell.

According to another embodiment of the invention and referring to FIG. 5, a metal supported tubular SOFC is produced in a manner similar to the method described in the first embodiment, except that the wooden metal-coated rod-like substrate 12 is replaced by a porous hollow tubular extruded tube (not shown). The metal tube is preferably in the order of about 1 mm in diameter with a wall thickness less than 500 μm and preferably in the order of about 200 μm, but these dimensions can be scaled up or down depending on the desired size of the fuel cell 10. The tube can be formed from a metal powder having coarse particles, which during sintering, produces a porous tube having a porosity in the order of greater than or equal to 20 vol. % and preferably around 60 vol %. Alternatively, the tube can be extruded from a mixture that contains combustible additives, which are combusted during sintering to produce a tube having the same porosity. Now the tube may be shaped into a desired fuel cell configuration. Then, the inner electrode layer 16 and electrolyte layer 18 may be applied by EPD according to the steps as described above. The rest of the steps are same as that described in the first embodiment.

While the preferred embodiment of the invention has been illustrated and described, it will be appreciated that various changes can be made therein without departing from the scope and spirit of the invention.

The invention claimed is:

1. A tubular solid oxide fuel cell assembly comprising:
   (a) a tubular, substantially metallic porous support layer; and
   (b) a tubular, functional layer assembly in concentric adjacent contact with the support layer, having a wall thickness less than or equal to 80 μm and comprising in concentric arrangement: a ceramic or cermet inner electrode layer, a ceramic middle electrolyte layer, and a ceramic or cermet outer electrode layer;
   wherein the support layer has sufficient mechanical strength to support the functional layer assembly, sufficient porosity to allow the flow of a reactant therethrough, and wherein the support layer and functional layer assembly are in mechanical and electrical contact, and the support layer has sufficient electrical conductivity to collect current during fuel cell operation.

2. A tubular solid oxide fuel cell assembly comprising:
   (a) a tubular, substantially metallic porous support layer; and
   (b) a tubular, functional layer assembly in concentric adjacent contact with the support layer, having a wall thickness less than or equal to 80 μm and comprising in concentric arrangement: a ceramic or cermet inner electrode layer, a ceramic middle electrolyte layer, and a ceramic or cermet outer electrode layer;
   wherein the support layer has sufficient mechanical strength to support the functional layer assembly, and sufficient porosity to allow the flow of a reactant therethrough and wherein the electrolyte composition substantially comprises a material selected from the group of yittria-stabilized zirconia and $Gd_2O_3$— doped $CeO_2$ and the electrolyte composition includes at least one sintering additive selected from the group of: cobalt oxide, copper oxide and iron oxide; cobalt, copper and iron; bismuth oxide; bismuth based (Bi—Sr—Ca—Cu—O) ceramic superconductors; and Bi—Sr—Ca—Cu—O.

3. A tubular solid oxide fuel cell assembly comprising:
   (a) a tubular, substantially metallic porous support layer; and
   (b) a tubular, functional layer assembly in concentric adjacent contact with the support layer, having a wall thickness less than or equal to 80 μm and comprising in concentric arrangement: a ceramic or cermet inner electrode layer, a ceramic middle electrolyte layer, and a ceramic or cermet outer electrode layer;
   wherein the support layer has sufficient mechanical strength to support the functional layer assembly, sufficient porosity to allow the flow of a reactant therethrough, and a thickness of between 20 and 500 μm, and wherein the support layer composition substantially consists of a material selected from the group consisting of: copper, nickel, copper-alloys, nickel-alloys, copper-nickel mixture, copper/ceramic cermet, copper-alloy/ceramic cermet, copper-nickel/ceramic cermet, copper-silver, and, copper-nickel-silver.

4. A tubular solid oxide fuel cell assembly comprising:
   (a) a tubular, substantially metallic porous support layer; and
   (b) a tubular, functional layer assembly in concentric adjacent contact with the support layer, having a wall thickness less than or equal to 80 μm and comprising in concentric arrangement: a ceramic or cermet inner electrode layer, a ceramic middle electrolyte layer, and a ceramic or cermet outer electrode layer;
   wherein the support layer has sufficient mechanical strength to support the functional layer assembly, and sufficient porosity to allow the flow of a reactant therethrough and wherein the support layer is inside the functional layer assembly and is in contact with the inner electrode layer.

5. A tubular solid oxide fuel cell assembly comprising:
   (a) a tubular, substantially metallic porous support layer; and (b) a tubular, functional layer assembly in concentric adjacent contact with the support layer, having a wall thickness less than or equal to 80 μm and comprising in concentric arrangement: a ceramic or cermet inner electrode layer, a ceramic middle electrolyte layer, and a ceramic or cermet outer electrode layer;

wherein the support layer has sufficient mechanical strength to support the functional layer assembly, and sufficient porosity to allow the flow of a reactant therethrough and wherein the functional layer assembly is inside the support layer and the support layer is in contact with the outer electrode layer.

6. A method of manufacturing a tubular solid oxide fuel cell assembly comprising:

(a) coating a tubular substantially metallic support layer with a ceramic or cermet inner electrode layer;

(b) coating the inner electrode layer with a ceramic electrolyte layer;

(c) coating the electrolyte layer with a ceramic or cermet outer electrode layer; then (d) sintering the layers to produce a hollow tubular metal-supported fuel cell;

the electrode and electrolyte layers having a collective wall thickness of 80 μm or less, the support layer having sufficient mechanical strength to support the electrode and electrolyte layers and sufficient porosity to flow a reactant therethrough, wherein the metal support layer includes combustible additives, and wherein in step (d), the combustible additives are combusted thereby producing a porous metal support layer.

7. A method of manufacturing a tubular solid oxide fuel cell assembly comprising:

(a) coating a tubular substantially metallic support layer with a ceramic or cermet inner electrode layer;

(b) coating the inner electrode layer with a ceramic electrolyte layer;

(c) coating the electrolyte layer with a ceramic or cermet outer electrode layer; then (d) sintering the layers to produce a hollow tubular metal-supported fuel cell;

the electrode and electrolyte layers having a collective wall thickness of 80 μm or less, the support layer having sufficient mechanical strength to support the electrode and electrolyte layers and sufficient porosity to flow a reactant therethrough, wherein at least one of the electrode layers includes combustible additives, and wherein in step (d) the combustible additives are combusted thereby producing an electrode layer with increased porosity.

8. A method of manufacturing a tubular solid oxide fuel cell comprising:

(a) coating a combustible non-conductive substrate member with a conductive substrate layer;

(b) coating the substrate layer with an inner electrode layer by electrophoretic deposition;

(c) coating the inner electrode layer with an electrolyte layer;

(d) coating the electrolyte layer with an outer electrolyte layer; then (e) drying and sintering the layers such that the substrate member combusts, thereby producing a hollow tubular fuel cell;

wherein the conductive substrate layer substantially comprises a non-combustible metal and a combustible additive, and wherein sufficient conductive substrate layer material is applied to provide the conductive substrate layer with sufficient mechanical strength to support the electrode and electrolyte layers during the fuel cell operation, and wherein during sintering, the combustible additive combusts thereby producing a porous metal support layer.

9. A method of manufacturing a tubular solid oxide fuel cell comprising:

(a) coating a combustible non-conductive substrate member with a combustible conductive substrate layer;

(b) coating the substrate layer with an inner electrode layer by electrophoretic deposition;

(c) coating the inner electrode layer with an electrolyte layer;

(d) coating the electrolyte layer with an outer electrolyte layer; then (e) drying and sintering the layers such that the substrate member and the substrate layer combust, thereby producing a hollow tubular fuel cell.

10. The method of claim 9 wherein between steps (a) and (b), the conductive substrate layer is coated with a substantially metallic support layer by electrophoretic deposition, the metallic support layer having sufficient mechanical strength to support the electrode and electrolyte layers during fuel cell operation, and sufficient porosity to enable the flow of a reactant therethrough.

11. The method of claim 9 further composing coating the outside electrode layer with a substantially metallic support layer to produce a porous, substantially metallic support layer having sufficient mechanical strength to support the electrode and electrolyte layers during fuel cell operation, and sufficient porosity to enable the flow of a reactant therethrough.

12. The method of claim 9 wherein sufficient electrode material is applied to produce an electrode-supported fuel cell.

13. A method of manufacturing a tubular solid oxide fuel cell comprising:

(a) coating a combustible non conductive substrate member with a polymer binding solution to enhance the smoothness and reduce the porosity of the substrate surface;

(b) applying a conductive substrate layer onto the polymer coated substrate member;

(c) coating the conductive substrate layer with an inner electrode layer by electrophoretic deposition;

(d) coating the inner electrode layer with an electrolyte layer;

(e) coating the electrolyte layer with an outer electrode layer; then drying and sintering the layers such that the substrate member combusts, thereby producing a hollow tubular fuel cell.

* * * * *